US007795836B2

(12) United States Patent
Muroi

(10) Patent No.: US 7,795,836 B2

(45) Date of Patent: Sep. 14, 2010

(54) MOTOR CONTROL DEVICE, MOTOR CONTROL METHOD, AND PROGRAM

(75) Inventor: Kazushige Muroi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1432 days.

(21) Appl. No.: 11/191,076

(22) Filed: Jul. 28, 2005

(65) Prior Publication Data

US 2006/0023007 A1 Feb. 2, 2006

(30) Foreign Application Priority Data

Jul. 28, 2004 (JP) ............................ 2004-220357

(51) Int. Cl.
*H02P 1/46* (2006.01)

(52) U.S. Cl. ....................... 318/700; 318/560; 318/721; 318/779

(58) Field of Classification Search ................. 318/560, 318/565, 568.16, 568.18, 599, 603, 650, 318/652, 661, 400.01, 400.14, 280, 281, 318/700, 66, 268, 257, 282, 721, 779, 799, 318/800; 400/279; 358/448; 347/1, 167, 347/196, 247

See application file for complete search history.

(56) References Cited

U.S. PATENT DOCUMENTS 5,023,924 A 6/1991 Tajima et al.
5,207,520 A * 5/1993 Tanaka ....................... 400/279
5,427,461 A * 6/1995 Hirai et al. .................. 400/279
5,467,173 A 11/1995 Sakata et al.
5,962,999 A 10/1999 Nakamura et al.
6,483,270 B1 * 11/2002 Miyazaki et al. ............ 318/700
6,719,396 B2 * 4/2004 Anzai .......................... 347/19
6,805,426 B2 10/2004 Kokubo et al.
6,822,411 B2 * 11/2004 Kobayashi .................. 318/560
6,838,855 B2 * 1/2005 Kobayashi et al. .......... 318/800
2003/0117448 A1 6/2003 Kokubo et al.

FOREIGN PATENT DOCUMENTS

JP 2-246786 A 10/1990
JP 6225580 8/1994
JP 6327285 11/1994
JP 7123769 5/1995
JP 10148184 6/1998
JP 11018475 1/1999
JP 2001-45780 A 2/2001
JP 2001286182 10/2001
JP 2003-189655 A 7/2003
JP 2003339197 11/2003

OTHER PUBLICATIONS

First Office Action dated Oct. 27, 2006 in Chinese Application No. 2005100875 84.1.
JP Office Action mailed Mar. 20, 2007, JP Appln. 2004-220357.

* cited by examiner

*Primary Examiner*—Bentsu Ro
*Assistant Examiner*—Antony M Paul

(57) ABSTRACT

A motor control device includes: an operation amount setting unit that sets an operation amount of a motor for driving a driving target according to a predetermined driving signal; and a control unit that generates the driving signal. The control unit generates an initial driving signal such that a velocity of the driving target follows an external velocity command, generates a cyclic signal having a cycle according to an angular velocity of a motor shaft of the motor, and generates the driving signal by multiplying the initial driving signal and the cyclic signal, based on at least one of a position and a velocity of the driving target.

24 Claims, 10 Drawing Sheets

MOTOR CONTROL DEVICE, MOTOR CONTROL METHOD, AND PROGRAM

BACKGROUND OF THE INVENTION

1. Field of the Invention

The present invention relates to a motor control device which controls a motor for driving a carriage of an image forming apparatus, such as an inkjet printer or the like, to a motor control method, and to a program.

2. Background Art

In the related art, an inkjet printer has a carriage that can reciprocate along a guide shaft in order to mount a recording head. The carriage is driven by means of a motor, such as a direct current (DC) motor or the like.

The DC motor has a structural problem in that, even when an input current value or voltage value is constant, torque is not uniform during the rotation of a motor shaft and thus a cyclic change in torque, which is a so-called cogging cycle, occurs. For this reason, the rotational velocity of the DC motor is pulsated periodically. As a result, the driving velocity of the carriage to be driven by the DC motor is also pulsated periodically.

When the driving velocity becomes high due to the pulsation of the driving velocity of the carriage, ink is ejected from the recording head on a recording medium at a large interval, which causes a thin color in a corresponding portion. On the contrary, when the driving velocity of the carriage becomes low, ink is ejected from the recording head on the recording medium at a small interval, which causes a thick color in a corresponding portion.

Accordingly, if the driving velocity of the carriage is pulsated, as for regions where colors must be recorded with the same concentration, thick color regions and thin color regions alternately appear, which results in a stripe shape.

Therefore, a method has been suggested in which the pulsation in the driving velocity of the carriage is reduced by overlapping a cyclic signal, which has the same cycle as the cogging cycle but has a phase opposite to that of the cogging cycle, and the driving signal of the DC motor (See JP-A-11-18475) each other. For example, at a timing at which torque of the DC motor is increased by the cogging cycle, the output of the driving signal is reduced by the overlap cyclic signal to suppress the driving velocity of the carriage. On the contrary, at a timing at which torque of the DC motor is decreased, the driving signal is increased by the overlap cyclic signal to increase the driving velocity of the carriage. Therefore, the driving velocity of the carriage becomes constant.

SUMMARY OF THE INVENTION

However, in the method in which the cyclic signal overlaps, the ratio of the cyclic signal occupying the entire output of the driving signal becomes excessive.

For example, the value of the driving signal of the DC motor is lowered in the vicinity of the end of the driving range of the carriage in order to decrease the velocity of the carriage. If the cyclic signal overlaps the low driving signal, however, the ratio of the cyclic signal occupying the entire output of the driving signal is increased and thus the driving signal is largely pulsated as a whole. In this case, the driving of the carriage becomes unstable and the correct control cannot be performed accordingly.

The present invention has been made in view of the above-described problems, and it is an object of the present invention to provide a motor control device which can exclude an influence by a cyclic change in torque of a motor so as not to cause an operation of a driving target to be driven by the motor to be unstable, a motor control method, and a program.

The invention provides a motor control device including: an operation amount setting unit that sets an operation amount of a motor for driving a driving target according to a predetermined driving signal; and a control unit that generates the driving signal, wherein the control unit includes: an initial driving signal generating section configured to generate an initial driving signal based on at least one of a position and a velocity of the driving target such that a velocity of the driving target follows an external velocity command, a cyclic signal generating section configured to generate a cyclic signal having a cycle according to a motor velocity of the motor, and a driving signal generating section configured to generate the driving signal by multiplying the initial driving signal and the cyclic signal or by dividing the initial driving signal with the cyclic signal.

The invention may provide an image forming apparatus including: an image forming unit that forms an image on a medium while reciprocating; a motor that drives the image forming unit as a driving target; and a motor control device including: an operation amount setting unit that sets an operation amount of the motor according to a predetermined driving signal, and a control unit that generates the driving signal; wherein the control unit includes: an initial driving signal generating section configured to generate an initial driving signal based on at least one of a position and a velocity of the driving target such that a velocity of the driving target follows an external velocity command, a cyclic signal generating section configured to generate a cyclic signal having a cycle according to a motor velocity of the motor, and a driving signal generating section configured to generate the driving signal by multiplying the initial driving signal and the cyclic signal or by dividing the initial driving signal with the cyclic signal.

The invention may provide a program product for enabling a computer to control a motor, including: software instructions for enabling the computer to perform predetermined operations; and a computer readable medium bearing the software instructions; wherein the predetermined operations including: generating an initial driving signal such that a velocity of the driving target follows an external velocity command; generating a cyclic signal having a cycle according to an angular velocity of a motor shaft of the motor; multiplying the initial driving signal and the cyclic signal or dividing the initial driving signal with the cyclic signal, to generate a driving signal; and setting an operation amount of the motor according to the driving signal.

The invention may provide a motor control method of controlling a motor that drives a driving target, the motor control method including: generating an initial driving signal such that a velocity of the driving target follows an external velocity command, on the basis of at least one of a position and a velocity of the driving target; generating a cyclic signal having a cycle according to an angular velocity of a motor shaft of the motor; multiplying the initial driving signal and the cyclic signal or dividing the initial driving signal with the cyclic signal, to generate a driving signal; and setting an operation amount of the motor according to the driving signal.

BRIEF DESCRIPTION OF THE DRAWINGS

The present invention may be more readily described with reference to the accompanying drawings.

DETAILED DESCRIPTION OF THE PREFERRED EMBODIMENTS

Hereinafter, embodiments of a motor control device and a motor control method according to the present invention will be described.

First Embodiment a) First, the configuration of an inkjet printer (an image forming apparatus) using a motor control device according to the present invention will be described with reference to FIG. 1.

Figure 1:
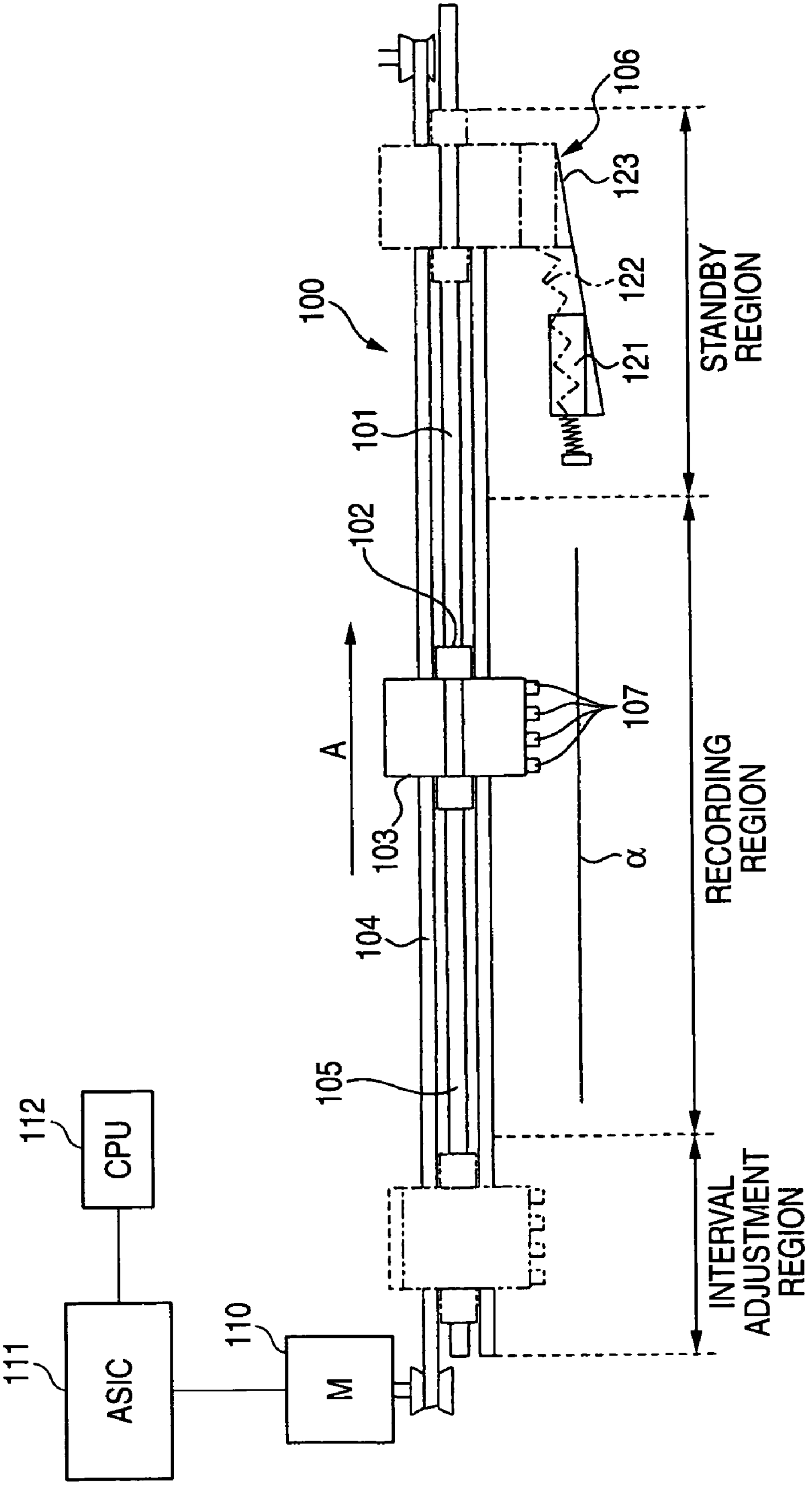
FIG. 1 is a diagram illustrating a schematic configuration of a recording mechanism in an inkjet printer.

FIG. 1 is a diagram illustrating the schematic configuration of a recording mechanism in an inkjet printer. The recording mechanism 100 of the inkjet printer includes a guide shaft 101, a carriage (driving target) 102 that can reciprocate along the guide shaft 101, a recording head 103 that is mounted on the carriage 102, a belt 104 that transfers driving power from a motor 110 to the carriage 102, and an encoder 105 that detects a travel distance and a position of the carriage 102.

The motor (the C motor) 110 rotates when an application specific integrated circuit (ASIC) (control unit) 111 outputs a driving signal according to various instructions from a central processing unit (CPU) (control unit) 112, thereby driving the endless belt 104 which is disposed in parallel with the guide shaft 101. As driving power is transferred to the carriage 102, the carriage 102 and the recording head 103 reciprocate along the guide shaft 101. The carriage 102 has ink tanks of plural colors (not shown) mounted thereon. Ink of the colors contained in the ink tanks is ejected from nozzle units 107 of the recording head 103 to a recording paper α.

The encoder 105 can be a well-known linear encoder that outputs two kinds of pulse signals having different phases when the carriage 102 travels. Though not shown in the drawing, an encoder strip, in which a plurality of slits are formed at predetermined intervals, is disposed along the guide shaft 101. Further, the two kinds of the pulse signals are input to the ASIC 111, when the carriage 102 travels, to be used as position and velocity information at the time of the control of the motor 110.

The recording mechanism 100 further includes a cap device 106, which covers all the nozzle units 107 of the recording head 103 and performs capping to prevent ink from being dried. The cap device 106 includes a slope 123 that is formed in a standby region outside a record region (a constant-velocity period), in which recording (printing) is performed on the recording paper α, and is formed upwardly toward the outside (the right side), a cap 121 that can move on the slope 123, and a spring 122 that pulls the cap 121 downwardly from the slope 123.

Figure 2:
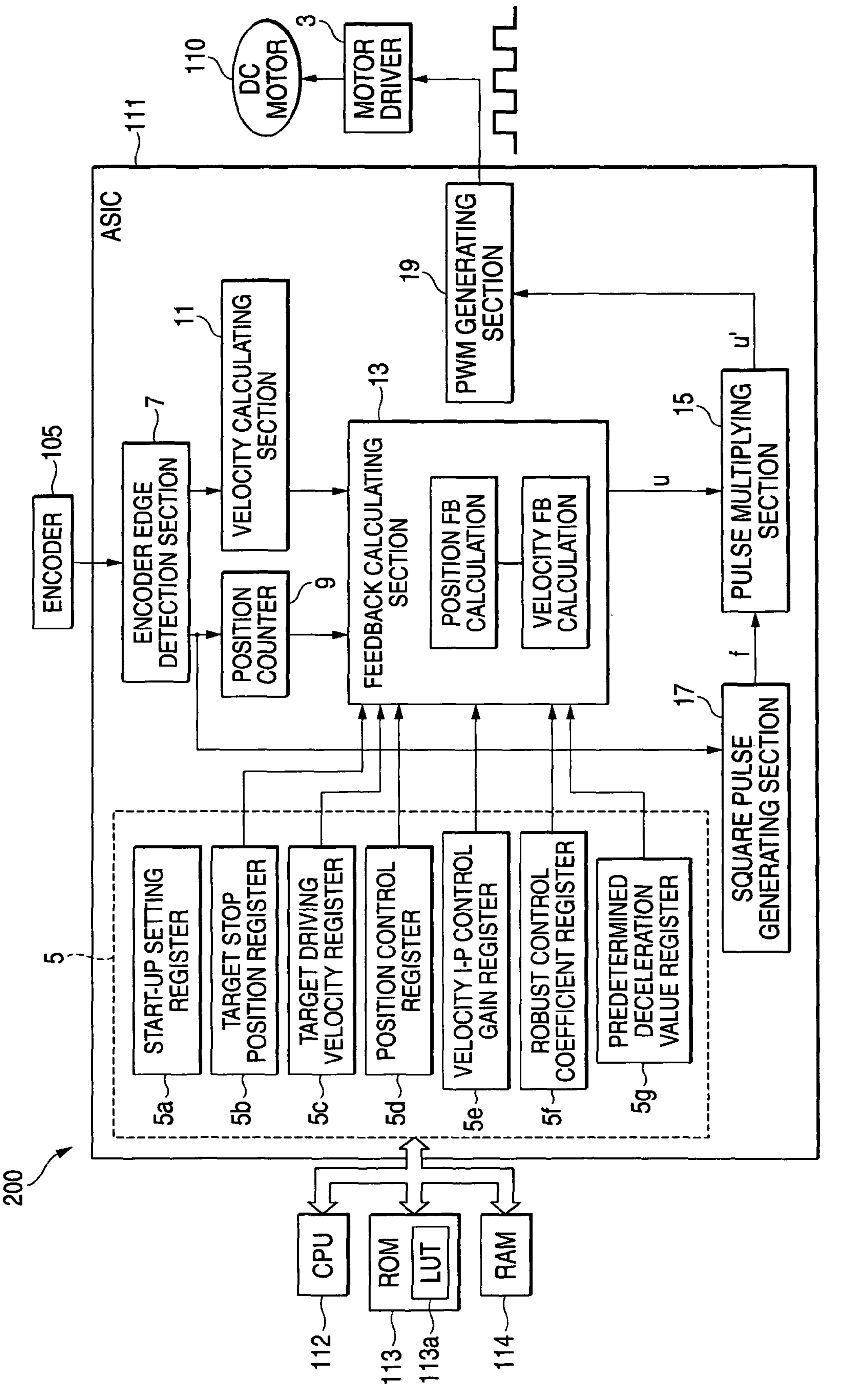
FIG. 2 is a block diagram showing a configuration of a motor control device.

On the other hand, the carriage 102 includes a hook (not shown). If the carriage 102 travels in an arrow A direction in the standby region, the hook is engaged with the cap 121. Further, if the carriage 102 moves toward a right end, the hook is pulled to the right side along the slope 123 according to the movement of the carriage 102, and the nozzle units 107 are gradually covered with the cap 121. If the right end of the carriage 102 reaches a home position, the nozzle units 107 are completely covered with the cap 121.

b) Next, the configuration of a motor control device 200 provided in the inkjet printer will be described with reference to the block diagram of FIG. 2.

The motor control device 200 functions to control the motor 110 that drives the carriage 102 of the inkjet printer.

The motor control device 200 includes the CPU 112 that controls the entire operation of the inkjet printer, a ROM 113 in which a program for executing a process to be described below is recorded, a RAM 114 in which various kinds of data are recorded, the ASIC 111 that generates a pulse width modulation (PWM) signal for controlling the rotation velocity or the rotation direction of the motor 110, and a motor driver 3 that drives the motor 110 based on the PWM signal generated from the ACIC 111. The ROM 113 includes a look-up table (LUT) 113*a* that stores cyclic signal waveforms for negating a change in cycle at the time of the rotation of the motor.

The ASIC 111 includes a register group 5 that stores various kinds of parameters to be used to control the motor 110. The register group 5 has a start-up setting register 5*a* for starting the motor 110, a target stop position register 5*b* that sets a target stop position of the motor 110, a target driving velocity register 5*c* that sets a target driving velocity of the motor 110, a position control register 5*d* that maintains the values of parameters constituting an arithmetic equation when a target velocity value is calculated at the time of the deceleration from a deceleration position, a velocity I-P control gain register 5*e* that maintains the values of parameters constituting an arithmetic equation when the operation amount for a desired velocity trace is calculated at the time of the acceleration, a robust control coefficient register 5*f* that maintains the values of parameters constituting an arithmetic equation when the operation amount for a stable operation at a target velocity is calculated, and a predetermined deceleration value register 5*g* that sets a position where the deceleration operation begins, a final target velocity at the time of the deceleration, and the value of a deceleration end position for achieving the target velocity.

An encoder edge detecting section 7 receives a pulse signal from the encoder 105, detects the edge of the pulse signal (for example, one or both of a rising edge and a falling edge, or the like), and outputs an encoder edge detection signal. A position counter 9 counts the detected edges so as to detect the position of the carriage 102.

A velocity calculating section 11 calculates and outputs the driving velocity of the carriage 102 based on the detection result in the encoder edge detecting section 7.

A feedback calculating section 13 generates an initial driving signal u by performing well-known positional feedback operation and velocity feedback operation based on the position of the carriage 102, which is detected by the position counter 9, the velocity of the carriage 102, which is detected by the velocity calculating section 102, and various parameters stored in the register group 5.

A pulse multiplying section 15 generates a driving signal u' by multiplying the initial driving signal u generated by the feedback calculating section 13 by a square pulse (cyclic signal) f generated by a square pulse generating section 17.

Further, the processes performed by the feedback calculating section 13, the pulse multiplying section 15 and the square pulse generating section 17 will be described below in detail.

Figure 3:
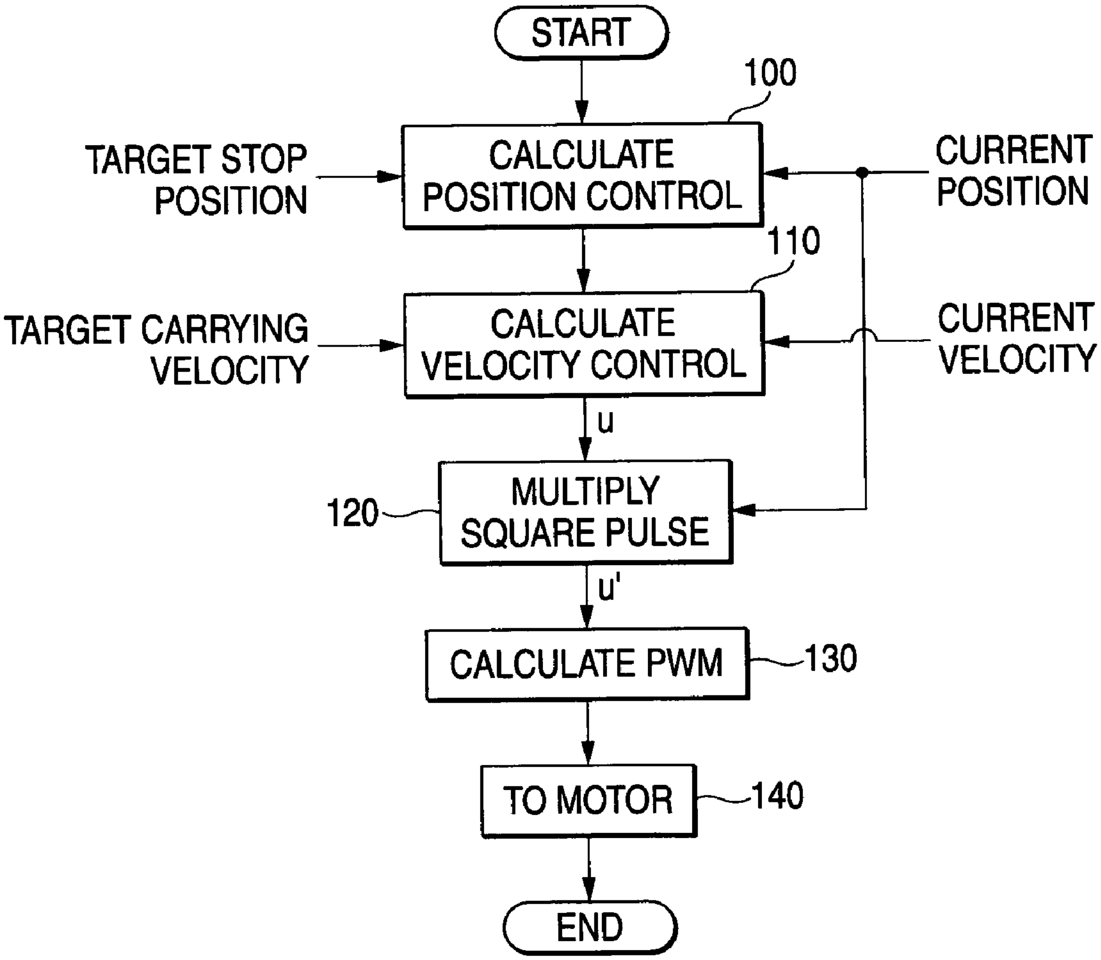
FIG. 3 is a flowchart showing a process in which a CPU and an ASIC control a motor.

A PWM generating section (operation amount setting unit) 19 generates a PWM signal (operation amount) according to the driving signal u', and outputs the generated PWM signal to the motor driver 3. Then, the motor driver 3 drives the motor 110, and the motor 110 is driven with desired driving power according to the set PWM value.

c) Next, the process in which the CPU 112 and the ASIC 111 control the motor 110 will be described with reference to the flowchart of FIG. 3. Moreover, the process shown in FIG. 3 can be repeatedly performed whenever predetermined time passes.

In a step 100, the feedback calculating section 13 of the ASIC 111 performs the positional control operation based on a current position of the carriage 102 and a target stop position set in the target stop position register 5*b*. Specifically, in a case in which the carriage 102 moves in the arrow A direction of FIG. 1, the feedback calculating section 13 detects whether or not the current position of the carriage 102 is on the right side than the right end of the record region. On the other hand, in a case in which the carriage 102 travels in a direction opposite to the arrow A, the feedback calculating section 13 detects whether or not the current position of the carriage 102 is on the left side than the right end of the record region.

In a step 110, the feedback calculating section 13 of the ASIC 111 performs the velocity control operation based on a current velocity of the carriage 102, a target return velocity set in the target return velocity register 5*c* (a velocity command from the outside), and the operation result in the step 100. In particular, the feedback calculating section 13 calculates the difference between the current velocity and the target carrying velocity, and generates the value of the initial driving signal u such that the difference is reduced. For example, if the velocity of the current carriage 102 is lower than the target carrying velocity, the feedback calculating section 13 increases the initial driving signal u. On the other hand, if the velocity of the current carriage 102 is higher than the target return velocity, the feedback calculating section 13 decreases the initial driving signal u.

In the step 100, the target carrying velocity may be a constant recording velocity when the position of the carriage 110 is in the record region (see FIG. 1). Further, when the position of the carriage 110 passes through the record region, the target carrying velocity may be a velocity slower than a predetermined recording velocity along the position of the carriage 102.

In a step 120, the pulse multiplying section 15 of the ASIC 111 generates the driving signal u' by multiplying the initial driving signal u by the square pulse f generated by the square pulse generating section 17.

In a step 130, the PWM generating section 19 of the ASIC 111 generates the PWM signal based on the driving signal u'.

In a step 140, the motor driver 3 drives the motor 110 according to the PWM signal.

d) Next, the process in which the CPU 112 and the ASIC 111 generate the square pulse f will be described with reference to the flowchart of FIG. 4. Moreover, the process shown in FIG. 4 can be repeatedly performed whenever predetermined time passes.

In a step 200, the square pulse generating section 17 calculates R based on the following equation.

$$R = \text{integer part of } [(x-n)/(p/2)]$$

where, x, p, and n can be defined as follows.

x: the current position of the carriage 102, which is detected by the position counter 9.

p: a cogging cycle of the motor 110 (the cycle of the cyclic change in torque).

n: a constant number that is set to minimize the influence of the cogging cycle in the velocity of the carriage 102 and that is a value smaller than p.

Specifically, n is set to cause the phase of the square pulse to become a phase that is ahead of a phase opposite to a phase of the change in torque of the motor 110 by predetermined time. If the phase of the square pulse is ahead of the phase opposite to the phase of the change in torque by predetermined time, even when the delay in the phase of the generated square pulse and the phase of the square pulse to be multiplied to the driving signal u' occurs, and the delay and predetermined time are negated. Then, the phase of the square pulse to be multiplied to the driving signal u' is opposite to the phase of the cycle of change in torque of the motor 110.

Further, if the delay in the phase of the generated square pulse and the phase of the square pulse to be multiplied to the driving signal u' is negligibly small, the value of n can be set to cause the phase of the square pulse to be opposite to the phase of the cycle of the change in torque of the motor 110.

In a step 210, it is judged whether or not the value calculated in the step 200 is an even number.

If it is judged that the value is the even number, the process proceeds to a step 220. If it is judged that the value is an odd number, the process proceeds to a step 230.

In the step 220, the result of f=1+k is set as the output value of the square pulse f at that time. Further, in the step 230, the result of f=1−k is set as the output value of the square pulse f at that time point.

In this case, k is a half of the amplitude of the square pulse f. k is set to minimize the change in the rotation number (that is, the change in the driving velocity of the carriage 102) of the motor 110, which is caused by the change in torque in the motor 110, in the record region, when the driving signal u is generated using the square pulse f and the motor 110 is driven.

In a step 240, the pulse multiplying section 15 of the ASIC 111 generates the driving signal u' by multiplying the initial driving signal u by the square pulse f generated by the square pulse generating section 17.

The square pulse f generated by the process of FIG. 4 will now be described with reference to FIG. 5. In FIG. 5, a cyclic change in torque (the cogging cycle) of the motor 110 is also shown.

Figure 4:
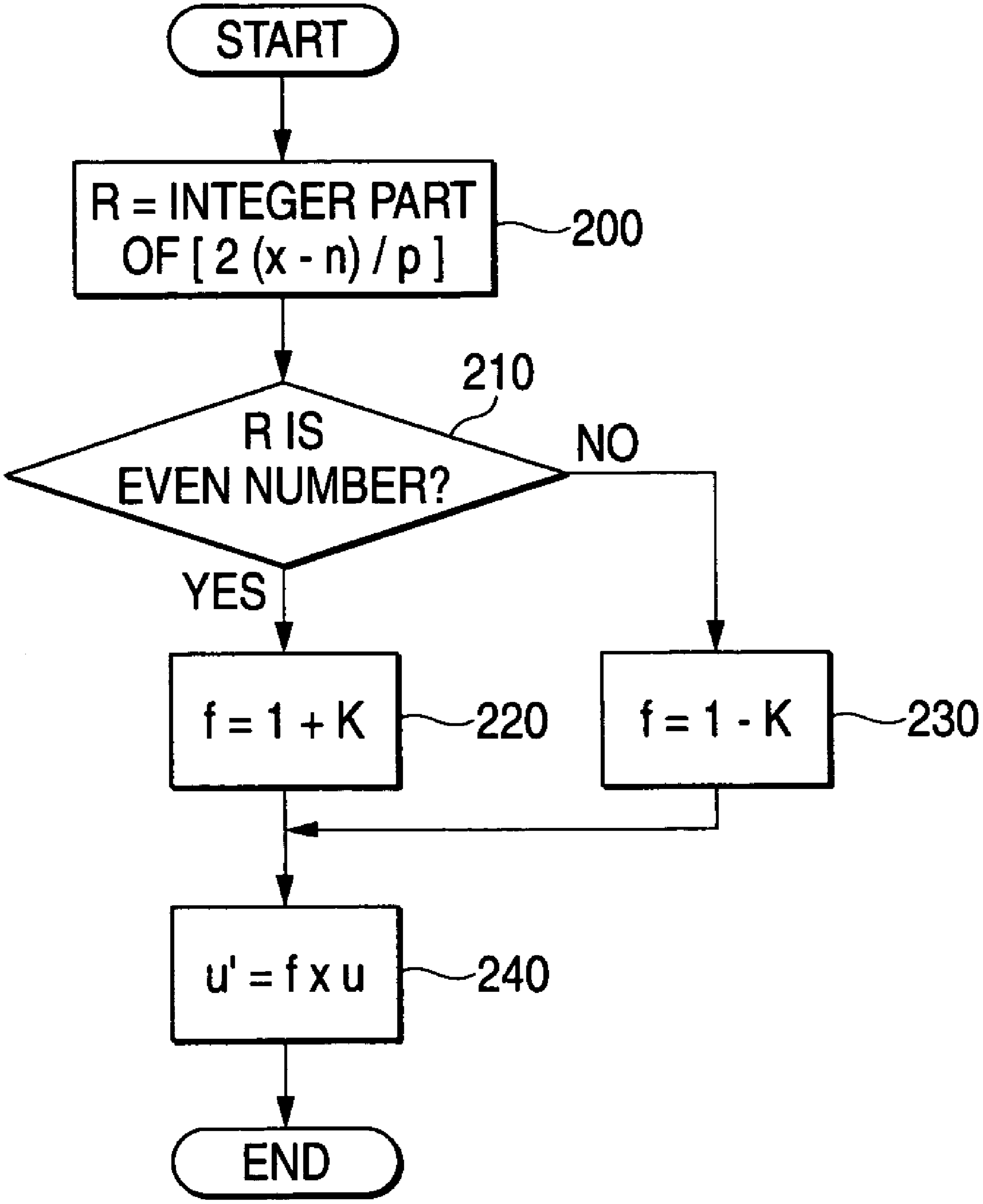
FIG. 4 is a flowchart showing a process in which the CPU and the ASIC generate a square pulse f.
Figure 5:
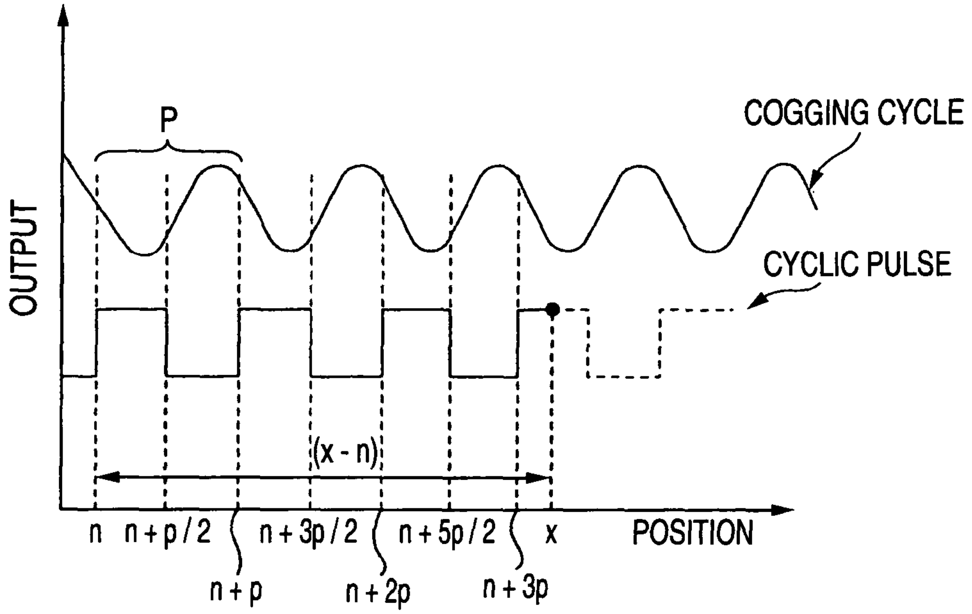
FIG. 5 is a diagram illustrating a method of generating the square pulse f.

When the current position x of the carriage 102 is in a range of from the constant number n, which is used to generate the square pulse f, to n+p/2, R calculated in the step 200 of FIG. 4 is the even number, and thus the value of the square pulse f is 1+k in the step 220.

Figure 6A:
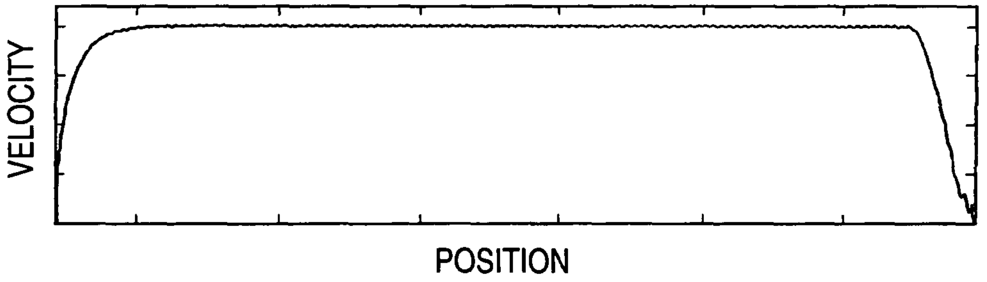
FIG. 6A is a graph showing the relationship between a position of a carriage and a driving velocity of the carriage 102.

Subsequently, in a range of from n+p/2 to n+3p/2, R calculated in the step 200 of FIG. 4 is an odd number, and thus the value of the square pulse f is 1−k in the step 230. In the same manner, whenever the current position x increases as mush as p, the value of the square pulse f is alternately changed between 1+k and 1−k. The square pulse f generated in such a manner has the same frequency as that of the cogging cycle and has a phase to be ahead of the phase opposite to the cogging cycle by predetermined time.

e) The advantages by the inkjet printer according to the present embodiment will now be described.

i) FIG. 6A is a graph showing the relationship between the position of the carriage 102 and the driving velocity of the carriage 102 in the present embodiment. As shown in FIG. 6A, when the carriage 102 is driven, the pulsation in the driving velocity of the carriage 102, which is caused by the cogging cycle of the motor 110, rarely occurs in the inkjet printer of the present embodiment.

Figure 6B:
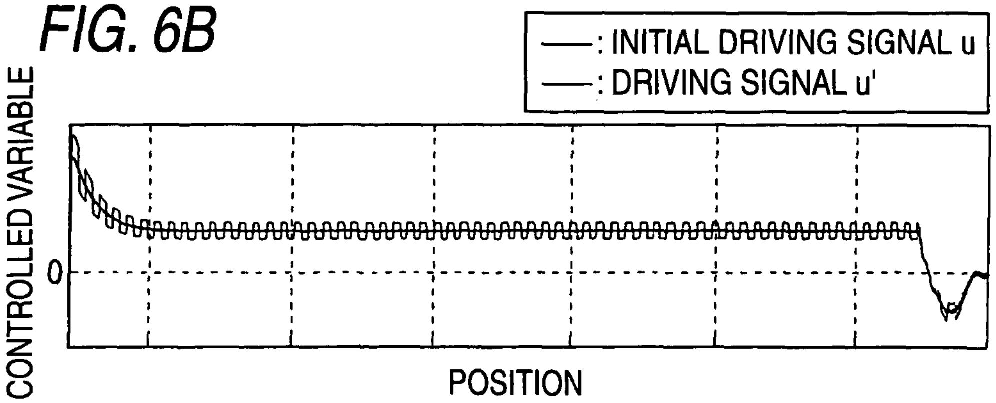
FIG. 6B is a diagram illustrating the relationship between the position of the carriage, and an initial driving signal u and a driving signal u'.

This is the advantage obtained by driving the motor 110 using the driving signal u' that is generated by multiplying the square pulse f, as shown in FIG. 6B.

That is, as shown in FIG. 5, at a timing at which torque of the motor 110 is decreased according to the cogging cycle, the output of the driving signal u' is decreased and an increase in the rotation number (that is, the driving velocity of the carriage 102) of the motor 110 is suppressed through the multiplication of the output 1−k of the square pulse f. On the other hand, at a timing at which torque of the motor 110 is decreased according to the cogging cycle, the output of the driving signal u' is increased and a decrease in the rotation number (that is, the driving velocity of the carriage 102) of the motor 110 is suppressed through the multiplication of the output 1+k of the square pulse f. As a result, the driving velocity of the carriage 102 is rarely influenced by the cogging cycle of the motor 102.

Figure 7A:
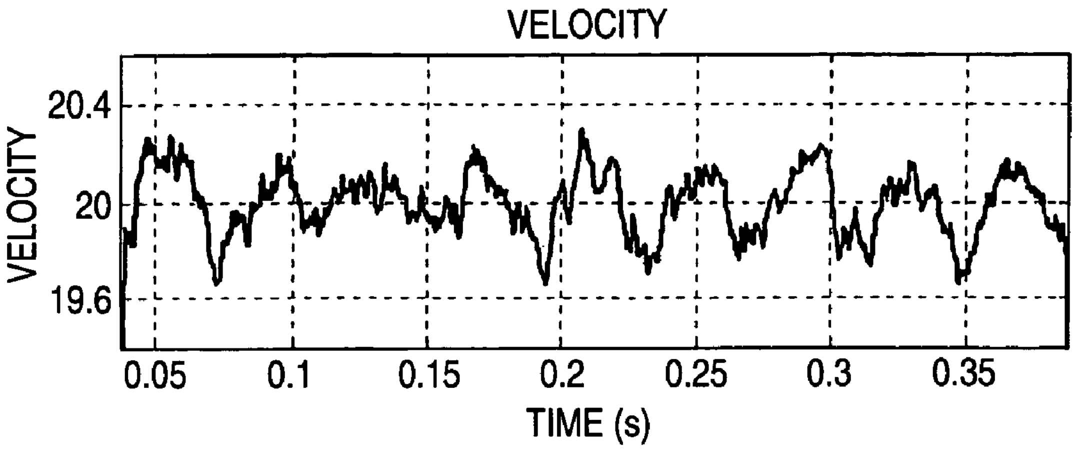
FIG. 7A is a graph showing an aspect of an embodiment in which the driving velocity of the carriage is changed when time passes.
Figure 7B:
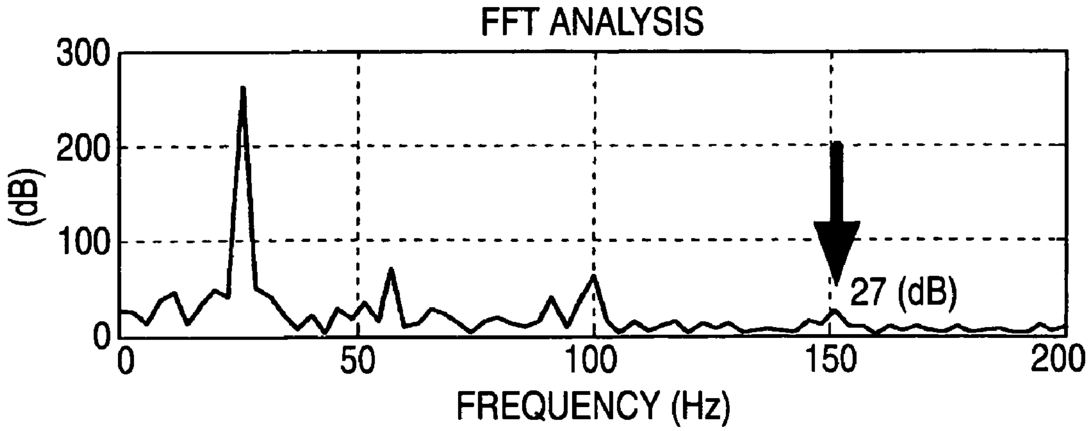
FIG. 7B is a graph showing the result of that a fast Fourier transformation performed on the graph of FIG. 7A.

FIG. 7A is a graph showing the aspect in which the driving velocity of the carriage 102 is changed when time passes. Further, FIG. 7B is a graph showing the result of a fast Fourier transformation (FFT) performed on the graph of FIG. 7A. The cogging cycle of the motor 110 is 150 Hz, but this frequency component rarely appears in the graph of FIG. 7B. Accordingly, in the present embodiment, it can be seen that the driving velocity of the carriage 102 is rarely influenced by the cogging cycle of the motor 110.

COMPARATIVE EXAMPLE 1

As a comparative example 1, a method of controlling the motor 110 without multiplying the square pulse f was performed. That is, the PWM signal is generated by sending the initial driving signal u generated in the feedback calculating section 13 of FIG. 2 to the PWM generating section 19, without multiplying the square pulse f.

Figure 8:
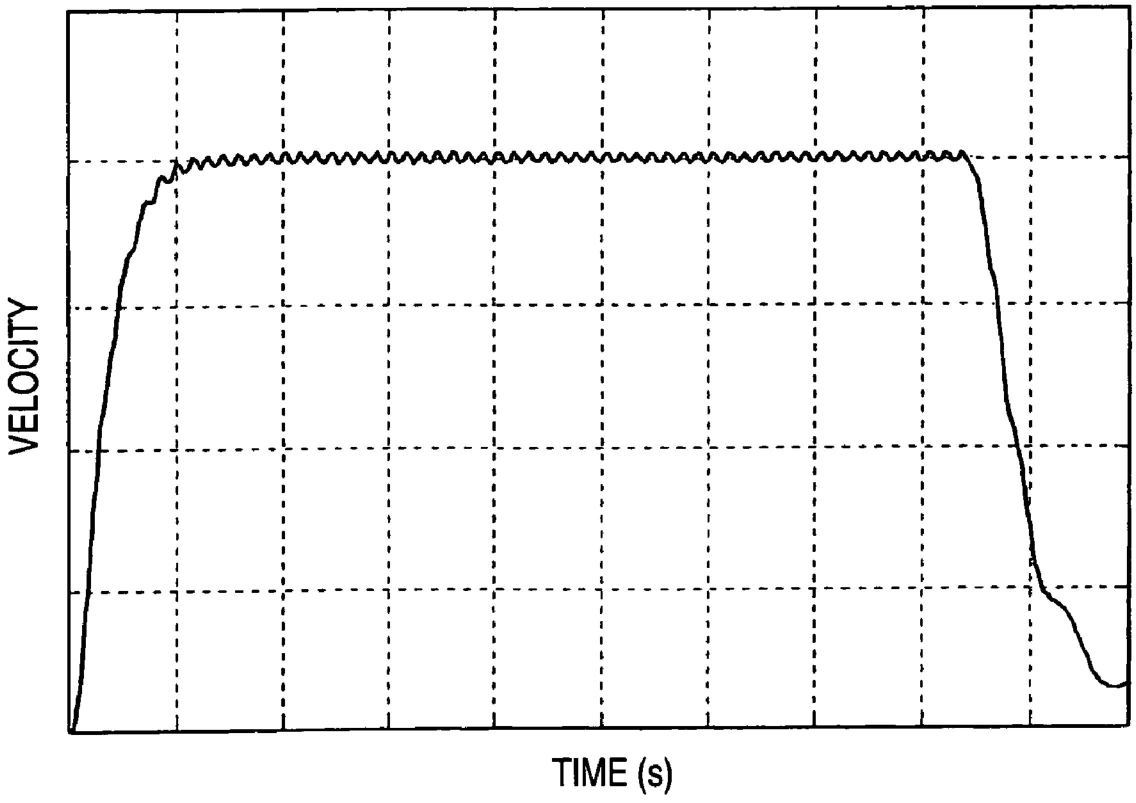
FIG. 8 is a graph showing an aspect of a comparative example 1 in which the driving velocity of the carriage is changed when time passes.

At this time, the aspect in which the driving velocity of the carriage 102 is changed when time passes is shown in FIG. 8. Referring to FIG. 8, it can be clearly seen that the cyclic pulsation greatly occurs in the driving velocity of the carriage 102. This pulsation is a change caused by the cogging cycle of the motor 110.

Figure 9A:
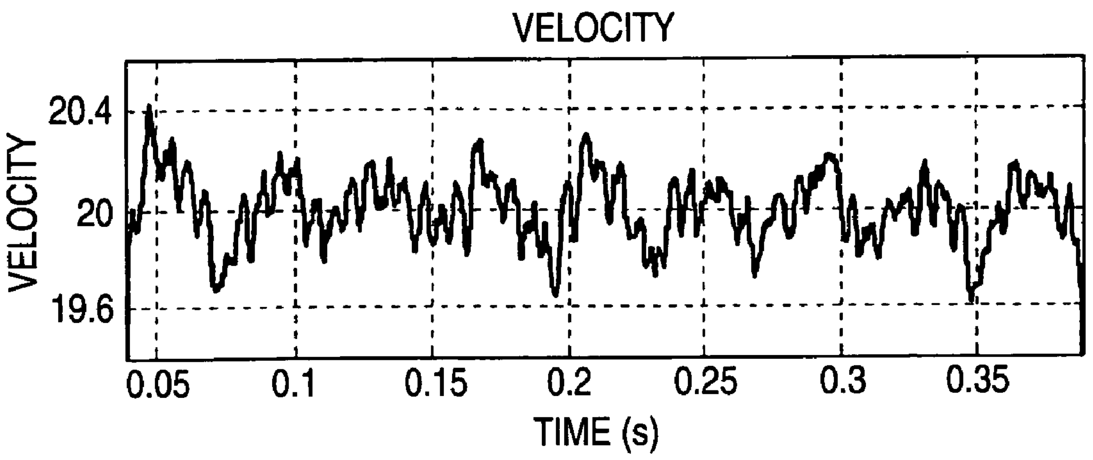
FIG. 9A is a graph showing an aspect of the comparative example 1 in which the driving velocity of the carriage is changed when time passes.
Figure 9B:
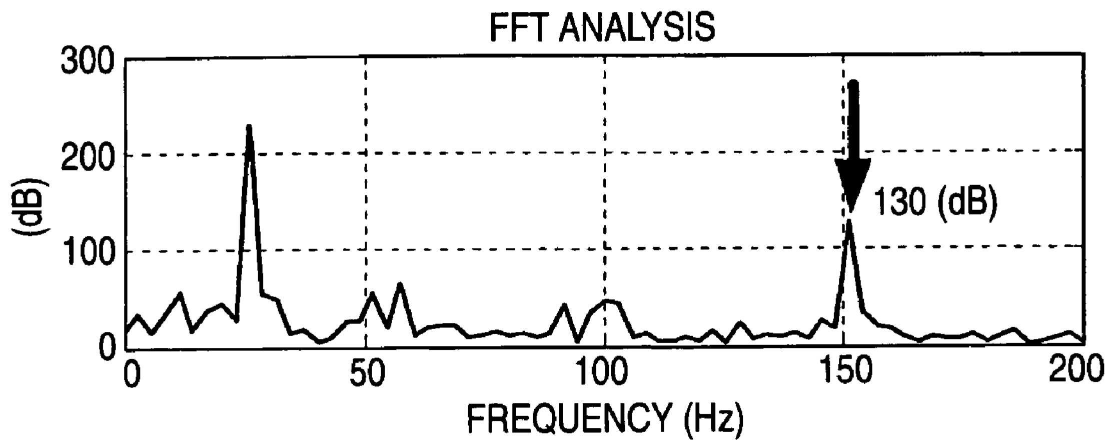
FIG. 9B is a graph showing the result of a fast Fourier transformation performed on the graph of FIG. 9A.

FIG. 9A is a graph showing the aspect in which the driving velocity of the carriage 102 is changed when time passes, in the comparative example 1. Further, FIG. 9B is a graph showing the result of the FFT operation performed on the graph of FIG. 9A. The cogging cycle of the motor 110 is 150 Hz, but this frequency component largely appears in the graph of FIG. 9B. Referring to these drawings, it can be seen that the driving velocity of the carriage 102 is greatly influenced by the cogging cycle of the motor 110, in the comparative example 1.

ii) In the present embodiment, the driving signal u' is generated by multiplying the initial driving signal u by the square pulse f. When the initial driving signal u is small, the amplitude caused by the square pulse f in the driving signal u' is also small. Accordingly, there is no case in which the ratio of the square pulse f occupying the entire output of the driving signal u' becomes excessive, and the operation of the carriage 102 becomes unstable.

Figure 10:
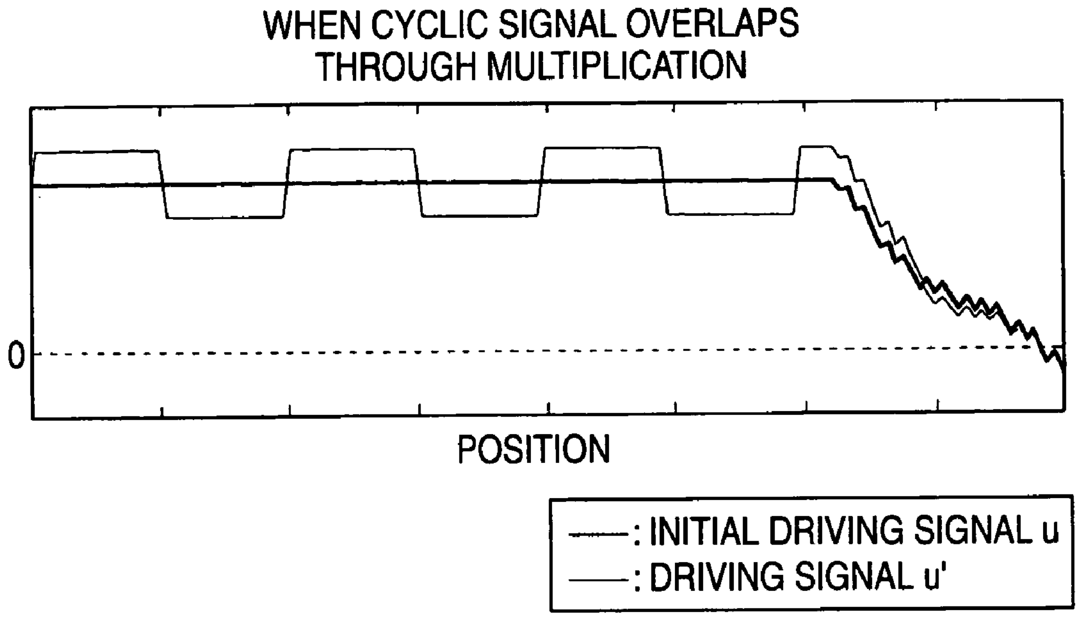
FIG. 10 is a diagram illustrating the initial driving signal u and the driving signal u' in the embodiment.

FIG. 10 is a graph showing the relationship between the position of the carriage 102, and the initial driving signal u and the driving signal u', in the present embodiment. In FIG. 10, a region on the right side is a region in which the carriage 102 is decelerated. The initial driving signal u is gradually decreased in that region. Even in the region where the initial driving signal u is decreased, a cyclic change in signal strength rarely appears in the driving signal u', which is obtained by multiplying the square pulse f. Accordingly, there is no case in which the operation of the carriage 102 becomes unstable.

COMPARATIVE EXAMPLE 2

As a comparative example 2, a method in which the initial driving signal u and the square pulse f overlap each other through the addition to generate the driving signal u' was performed. That is, a pulse overlapping section was provided, instead of the pulse multiplying section 15 of FIG. 2. Therefore, the initial driving signal u and the square pulse f overlapped each other to generate the driving signal u'.

Figure 11:
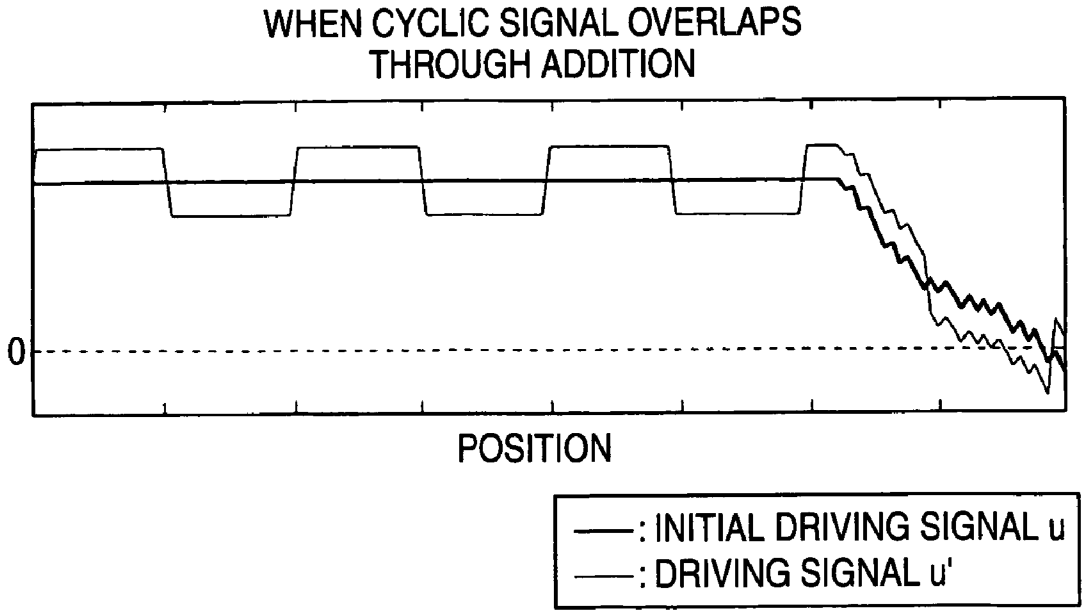
FIG. 11 is a diagram illustrating the initial driving signal u and the driving signal u' in a comparative example 2.

FIG. 11 is a graph showing the relationship between the position of the carriage 102, and the initial driving signal u and the driving signal u', in the comparative example 2. In FIG. 11, since a region on the right side is a region where the carriage 102 is decelerated, the initial driving signal u is gradually decreased. In the region where the initial driving signal u is decreased, the square pulse f having the same amount as that when the value of the initial driving signal is increased overlaps, even when the value of the initial driving signal u is decreased. Accordingly, the cyclic change in signal strength largely appears in the driving signal u', which causes the operation of the carriage 102 to be unstable.

That is, in the comparative example 2, the ratio of the cyclic component caused by the square pulse f occupying the entire driving signal u' is increased in a region where an absolute value of the driving signal u' is small. The change in the driving velocity of the carriage 102 is increased at that region, which causes the operation to be unstable.

iii) In the present embodiment, the square pulse f is used as a signal to be multiplied to the initial driving signal u. Since the square pulse f can be easily generated, the configuration of the ASIC 111 can be simplified.

iv) In the present embodiment, since the square pulse f is generated whenever predetermined time passes, it can be accurately generated according to the position and velocity of the carriage 102 at that time point. Thus, the influence by the change in torque of the motor 110 can be further reduced, and the rotation number of the motor 110 can be controlled to be constant.

Moreover, the present invention is not limited to the embodiment, but various modifications can be made within the scope without departing from the present invention.

For example, the waveform of the cyclic signal to be multiplied to the initial driving signal u is not limited to the square pulse, but may include other cyclic waveforms. For example, the waveform can include a triangular wave, a sine wave, or the like. Since the triangular wave is similar to the waveform of the cogging cycle, the cogging cycle can be negated more effectively.

Further, a synchronization signal generated from the pulse generating section can be stored in the LUT 113*a* in the ROM 113 in advance, for example. In this case, the synchronization signal can be read out from the LUT 113*a* in which signal data for one cycle is stored.

Figure 12:
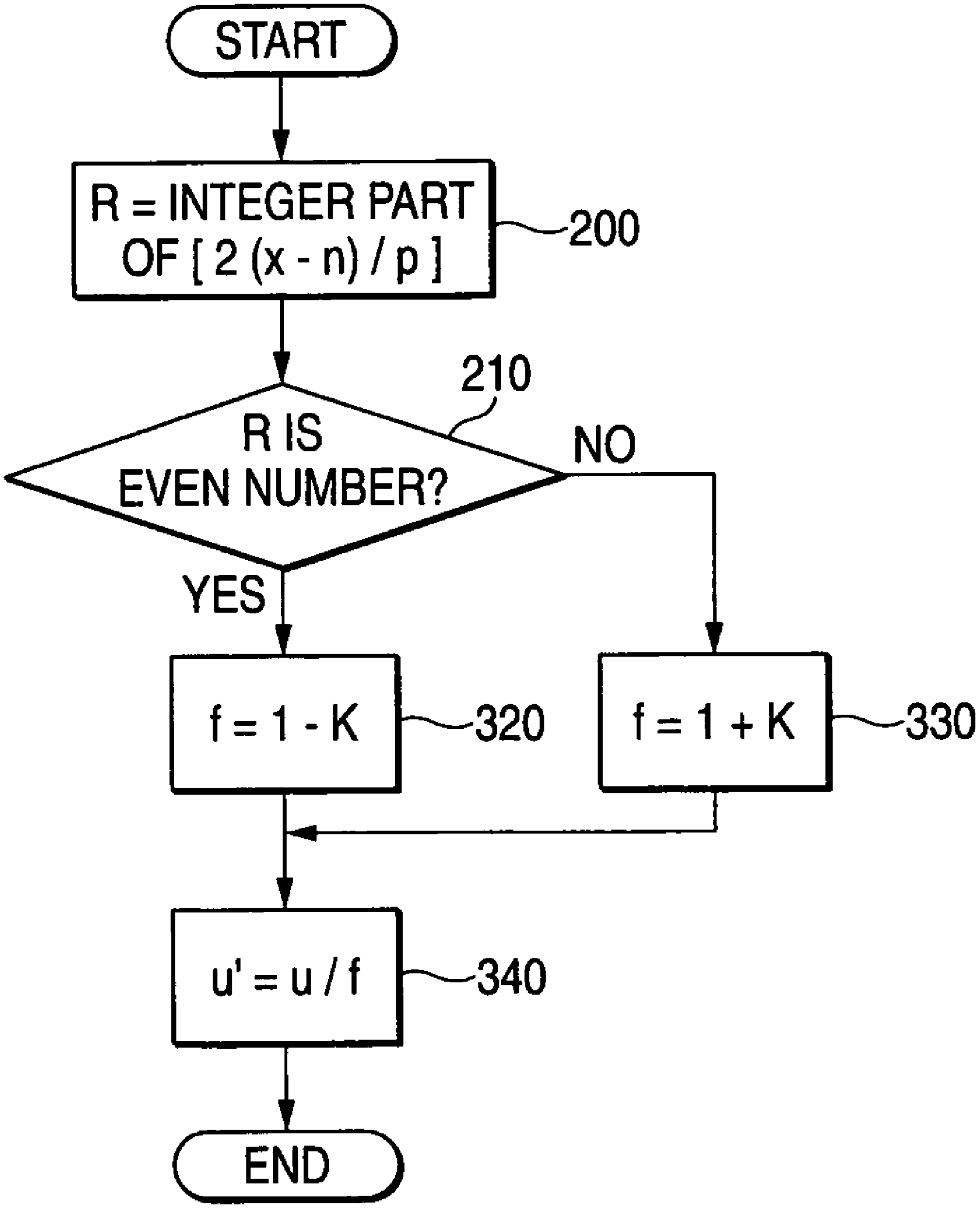
FIG. 12 is a flowchart showing another process in which the CPU and the ASIC generate a square pulse f.

In the embodiment, the pulse multiplying section 15 generates the driving signal u' by multiplying the initial driving signal u generated by the feedback calculating section 13 by the square pulse (cyclic signal) f generated by a square pulse generating section 17. However, the pulse multiplying section 15 may generate a driving signal u' by dividing the initial driving signal u with the square pulse (cyclic signal) f. A process in which the CPU 112 and the ASIC 111 generate the driving signal u' by dividing the initial driving signal u with the square pulse will be described with reference to the flowchart of FIG. 12. The process shown in FIG. 12 may be repeatedly performed whenever predetermined time passes. It is noted that the same step numbers and the same signs denote the same process and the same variables as those used in FIG. 4, and the duplicate description therefor will be omitted here. The process shown in FIG. 12 is different in the steps 320, 330 and 340 from that shown in FIG. 4. In the step 210, it is judged whether or not the value calculated in the step 200 is an even number.

If it is judged that the value is the even number, the process proceeds to a step 320. If it is judged that the value is an odd number, the process proceeds to a step 330.

In the step 320, the result of f=1−k is set as the output value of the square pulse f at that time. Further, in the step 330, the result of f=1+k is set as the output value of the square pulse f at that time point.

In a step 340, the pulse multiplying section 15 of the ASIC 111 generates the driving signal u' by dividing the initial driving signal u with the square pulse f generated by the square pulse generating section 17.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

What is claimed is:

1. A motor control device comprising:

an operation amount setting unit that sets an operation amount of a motor for driving a driving target according to a predetermined driving signal; and a control unit that generates the driving signal, wherein the control unit includes:

an initial driving signal generating section configured to generate an initial driving signal based on at least one of a position and a velocity of the driving target such that a velocity of the driving target follows an external velocity command, a cyclic signal generating section configured to generate a cyclic signal having a cycle according to a motor velocity of the motor, and a driving signal generating section configured to generate the driving signal by multiplying the initial driving signal and the cyclic signal or by dividing the initial driving signal with the cyclic signal.

2. The motor control device according to claim 1, wherein the motor velocity corresponds to an angular velocity of a motor shaft of the motor.

3. The motor control device according to claim 1, wherein the cyclic signal generating section sets the cycle of the cyclic signal to be the same as a cycle of a change in torque of the motor.

4. The motor control device according to claim 3, wherein the cyclic signal generating section sets a phase of the cyclic signal to be ahead of a phase of the change in torque by a predetermined time.

5. The motor control device according to claim 3, wherein the cyclic signal generating section sets the phase of the cyclic signal with a timing at which a change in velocity of the driving target caused by the change in torque is negated.

6. The motor control device according to claim 1, wherein the cyclic signal generating section sets the amplitude of the cyclic signal such that the change in the rotation number of the motor caused by a cyclic change in torque of the motor is minimized.

7. The motor control device according to claim 1, wherein the initial driving signal generating section generates the initial driving signal such that the velocity of the driving target becomes approximately constant in a predetermined constant-velocity period; and the cyclic signal generating section sets the amplitude of the cyclic signal such that the change in the rotation number of the motor caused by the change in torque of the motor is minimized in the constant-velocity period.

8. The motor control device according to claim 1, wherein the cyclic signal generating section generates the cyclic signal whenever a predetermined time passes.

9. An image forming apparatus comprising:

an image forming unit that forms an image on a medium while reciprocating;

a motor that drives the image forming unit as a driving target; and a motor control device including: an operation amount setting unit that sets an operation amount of the motor according to a predetermined driving signal, and a control unit that generates the driving signal;

wherein the control unit includes:

an initial driving signal generating section configured to generate an initial driving signal based on at least one of a position and a velocity of the driving target such that a velocity of the driving target follows an external velocity command, a cyclic signal generating section configured to generate a cyclic signal having a cycle according to a motor velocity of the motor, and a driving signal generating section configured to generate the driving signal by multiplying the initial driving signal and the cyclic signal or by dividing the initial driving signal with the cyclic signal.

10. The image forming apparatus according to claim 9, wherein the motor velocity corresponds to an angular velocity of a motor shaft of the motor.

11. The image forming apparatus according to claim 9, wherein the cyclic signal generating section sets the cycle of the cyclic signal to be the same as a cycle of a change in torque of the motor.

12. The image forming apparatus according to claim 11, wherein the cyclic signal generating section sets a phase of the cyclic signal to be ahead of a phase of the change in torque by a predetermined time.

13. The image forming apparatus according to claim 11, wherein the cyclic signal generating section sets the phase of the cyclic signal with a timing at which a change in velocity of the driving target caused by the change in torque is negated.

14. The image forming apparatus according to claim 9, wherein the cyclic signal generating section sets the amplitude of the cyclic signal such that the change in the rotation number of the motor caused by a cyclic change in torque of the motor is minimized.

15. The image forming apparatus according to claim 9, wherein the initial driving signal generating section generates the initial driving signal such that the velocity of the driving target becomes approximately constant in a predetermined constant-velocity period; and the cyclic signal generating section sets the amplitude of the cyclic signal such that the change in the rotation number of the motor caused by the change in torque of the motor is minimized in the constant-velocity period.

16. The image forming apparatus according to claim 9, wherein the cyclic signal generating section generates the cyclic signal whenever a predetermined time passes.

17. A non-transitory computer readable medium having executable instructions stored thereon, which when executed by a computer perform predetermined operations to control a motor, the predetermined operations comprising:

generating an initial driving signal such that a velocity of the driving target follows an external velocity command;

generating a cyclic signal having a cycle according to an angular velocity of a motor shaft of the motor;

multiplying the initial driving signal and the cyclic signal or dividing the initial driving signal with the cyclic signal, to generate a driving signal; and setting an operation amount of the motor according to the driving signal.

18. A motor control method of controlling a motor that drives a driving target, the motor control method comprising:

generating an initial driving signal such that a velocity of the driving target follows an external velocity command, on the basis of at least one of a position and a velocity of the driving target;

generating a cyclic signal having a cycle according to an angular velocity of a motor shaft of the motor;

multiplying the initial driving signal and the cyclic signal or dividing the initial driving signal with the cyclic signal, to generate a driving signal; and setting an operation amount of the motor according to the driving signal.

19. The motor control method according to claim 18, wherein the cyclic signal has the same cycle as that of a change in torque of the motor.

20. The motor control method according to claim 19, wherein a phase of the cyclic signal is set to be ahead of a phase of the change in torque by a predetermined time.

21. The motor control method according to claim 19, wherein a phase of the cyclic signal is set to be a timing at which a change in velocity of the driving target caused by the change in torque is negated.

22. The motor control method according to claim 18, wherein the amplitude of the cyclic signal is set such that a change in the rotation number of the motor caused by a cyclic change in torque of the motor is minimized.

23. The motor control method according to claim 18, wherein the initial driving signal is generated such that the velocity of the driving target becomes approximately constant in a predetermined constant-velocity period, and the amplitude of the cyclic signal is set such that the change in the rotation number of the motor caused by the change in torque of the motor is minimized in the constant-velocity period.

24. The motor control method according to claim 18, wherein the cyclic signal is generated whenever a predetermined time passes.

* * * * *